(12) United States Patent
Narayanaswami

(10) Patent No.: US 6,188,442 B1
(45) Date of Patent: Feb. 13, 2001

(54) MULTIVIEWER DISPLAY SYSTEM FOR TELEVISION MONITORS

(75) Inventor: Chandrasekhar Narayanaswami, Wilton, CT (US)

(73) Assignee: International Business Machines Corporation, Armonk, NY (US)

( * ) Notice: Under 35 U.S.C. 154(b), the term of this patent shall be extended for 0 days.

(21) Appl. No.: 08/904,677

(22) Filed: Aug. 1, 1997

(51) Int. Cl.[7] .............................. H04N 13/04; G09G 5/00
(52) U.S. Cl. .............................. 348/564; 348/52; 348/53; 348/56; 348/588; 345/7
(58) Field of Search .................................. 348/42, 52, 53, 348/56, 39, 46–48, 345, 385, 386, 387, 584, 588, 564; 345/7, 8

(56) References Cited

U.S. PATENT DOCUMENTS

| | | | |
|---|---|---|---|
| 2,832,821 | * 4/1958 | Du Mont | 350/370 |
| 4,424,529 | * 6/1984 | Rose et al. | 358/88 |
| 4,562,463 | * 12/1985 | Lipton | 358/88 |
| 5,182,796 | * 1/1993 | Shibayama et al. | 395/156 |
| 5,821,989 | * 10/1998 | Lazarro et al. | 348/56 |
| 5,903,816 | * 5/1999 | Broadwin et al. | 455/3.1 |
| 5,907,364 | * 5/1999 | Furuhata et al. | 348/459 |

* cited by examiner

Primary Examiner—Andrew I. Faile
Assistant Examiner—Kieu-Oanh Bui
(74) Attorney, Agent, or Firm—Perman & Green, LLP; Jay Sbrollini (57) ABSTRACT

A display monitor (12) operates in a time-multiplexed fashion to display a plurality of viewer-selected video channels on a single display screen. A visual apparatus (22) worn by the viewers is synchronized to the operation of the display monitor for enabling each of the viewers to observe the display screen only at times when the viewer-selected video channel is being displayed.

42 Claims, 6 Drawing Sheets

FIG.1

| TV IMAGE | A's SHUTTER | B's SHUTTER | C's SHUTTER | TIME |
|---|---|---|---|---|
| CHANNEL A | OPEN | CLOSED | CLOSED | 0 |
| CHANNEL B | CLOSED | OPEN | CLOSED | 1/180 |
| CHANNEL C | CLOSED | CLOSED | OPEN | 2/180 |
| CHANNEL A | OPEN | CLOSED | CLOSED | 3/180 |
| CHANNEL B | CLOSED | OPEN | CLOSED | 4/180 |
| CHANNEL C | CLOSED | CLOSED | OPEN | 5/180 |
| CHANNEL A | OPEN | CLOSED | CLOSED | 6/180 |
| CHANNEL B | CLOSED | OPEN | CLOSED | |
| CHANNEL C | CLOSED | CLOSED | OPEN | |

MULTIVIEWER DISPLAY SYSTEM FOR TELEVISION MONITORS

FIELD OF THE INVENTION

This invention is related to television (TV) monitors and display systems and, in particular, to display systems providing simultaneous visual/audio presentations to a plurality of viewers.

BACKGROUND OF THE INVENTION

A problem is created when different people desire to view different TV programs, or to listen to audio in different languages. In a home environment this situation typically results in different members of the family watching different TVs in different rooms of the home. For a number of reasons this common solution to the problem is less than desirable. For example, this solution to the problem requires the family to own multiple TVs, and possibly multiple reception devices, such as cable converter boxes and/or satellite antennas. This problem is compounded if one of the TVs is a large screen TV, which may be in demand by all of the family members.

In the field of stereo computer graphics it is known to project different images for the left and right eyes. A viewer then uses so-called shutter glasses to view the image in stereo. The shutter glass system works by closing the shutter for one eye for a brief period during which the other eye views what is displayed on the screen. This process is alternated for the left eye and the right eye. The images on the screen are adapted for each eye, based on the displacement between the viewer's eyes. So when the shutter for the left eye is open, it displays the image for the left eye and vice-versa. The persistence of human vision ensures that the images are "seen" simultaneously. The use of such a system enables a viewer to view a displayed image in a stereoscopic sense, and thus perceive depth.

In greater detail, in such traditional stereo graphics displays a receiver on the shutter glasses, such as an infrared (IR) receiver, receives a synchronization signal from the stereo monitor. The synchronization signal causes liquid crystal (LC) panels or shutters in the glasses (one for each eye) to switch from being opaque to transparent and vice versa. When opaque, the viewer cannot see through the shutter. The shutter for the left and right eye switch in an alternate fashion and, at any given time, only one eye can see the displayed image. However, the persistence of human vision results in both eyes seeing their corresponding images simultaneously.

While the LC shutters are being controlled in this fashion, the display monitor is displaying images alternately for the left eye and right eye. The image for the left eye differs from the image for the right eye. This difference is what gives the perception of depth. In a computer generated image, the image for the left eye is created by treating the center of the camera to coincide with the center of the left eye and vice-versa. As a result, the two images differ in camera position.

Some stereo and virtual reality systems use small displays (e.g., LCDs) provided within head sets worn by a user. However, the use of such a system presents at least two problems. The first is the current low resolution of such displays, resulting in poor image quality. The second, and more important problem, is that the use of the head set isolates the viewer from his or her surroundings, making it difficult for the viewer to interact with objects and persons in the viewer's environment.

At present, there is no system known to the inventor that allows viewers to simultaneously watch different programs using the same TV monitor.

OBJECTS OF THE INVENTION

It is a first object of this invention to provide a solution to the foregoing problems that enables multiple viewers in a room to unobtrusively and simultaneously view different TV programs.

It is a further object of this invention to provide a display monitor that operates in a time-multiplexed fashion to display a plurality of viewer-selected video channels on a single display screen, and to also provide visual apparatus worn by the viewers, the video apparatus being synchronized to the operation of the display monitor for enabling each of the viewers to observe the display screen only at times when the viewer-selected video channel is being displayed.

SUMMARY OF THE INVENTION

The foregoing and other problems are overcome and the objects of the invention are realized by methods and apparatus in accordance with embodiments of this invention.

In a method of this invention steps are disclosed for simultaneously viewing a plurality of video channels, on one display screen, with a plurality of viewers. The steps of the method include (a) providing each of the plurality of viewers with visual apparatus that operates in two modes, wherein in a first mode the viewer is enabled to view an image on the display screen through the visual apparatus, while in the second mode the viewer is disabled by the visual apparatus from viewing an image on the display screen. A second step (b) operates a display monitor that includes the display screen so as to time multiplex the display of a plurality of video channels selected by the plurality of viewers. A third step (c) synchronizes the operation of each of the plurality of visual apparatus with the display screen such that each viewer is enabled to view the image on the display screen only during a time when a viewer-selected video channel is being displayed on the display screen.

The visual apparatus includes at least one electrically actuated liquid crystal shutter that is transparent in the first mode and opaque in the second mode, and wherein the step of synchronizing includes a step of transmitting information to the visual apparatus, preferably over a wireless link, for indicating a time when the at least one liquid crystal shutter is to switch from being transparent to being opaque, and from being opaque to being transparent.

The method further includes steps of: (d) receiving, at each of the visual apparatus, an audio channel associated with the viewer-selected video channel; and (e) converting the received audio channel into an audio signal for the viewer.

At least one of the video channels may provide access to a data communications network such as the internet.

BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION OF THE INVENTION

Figure 1:
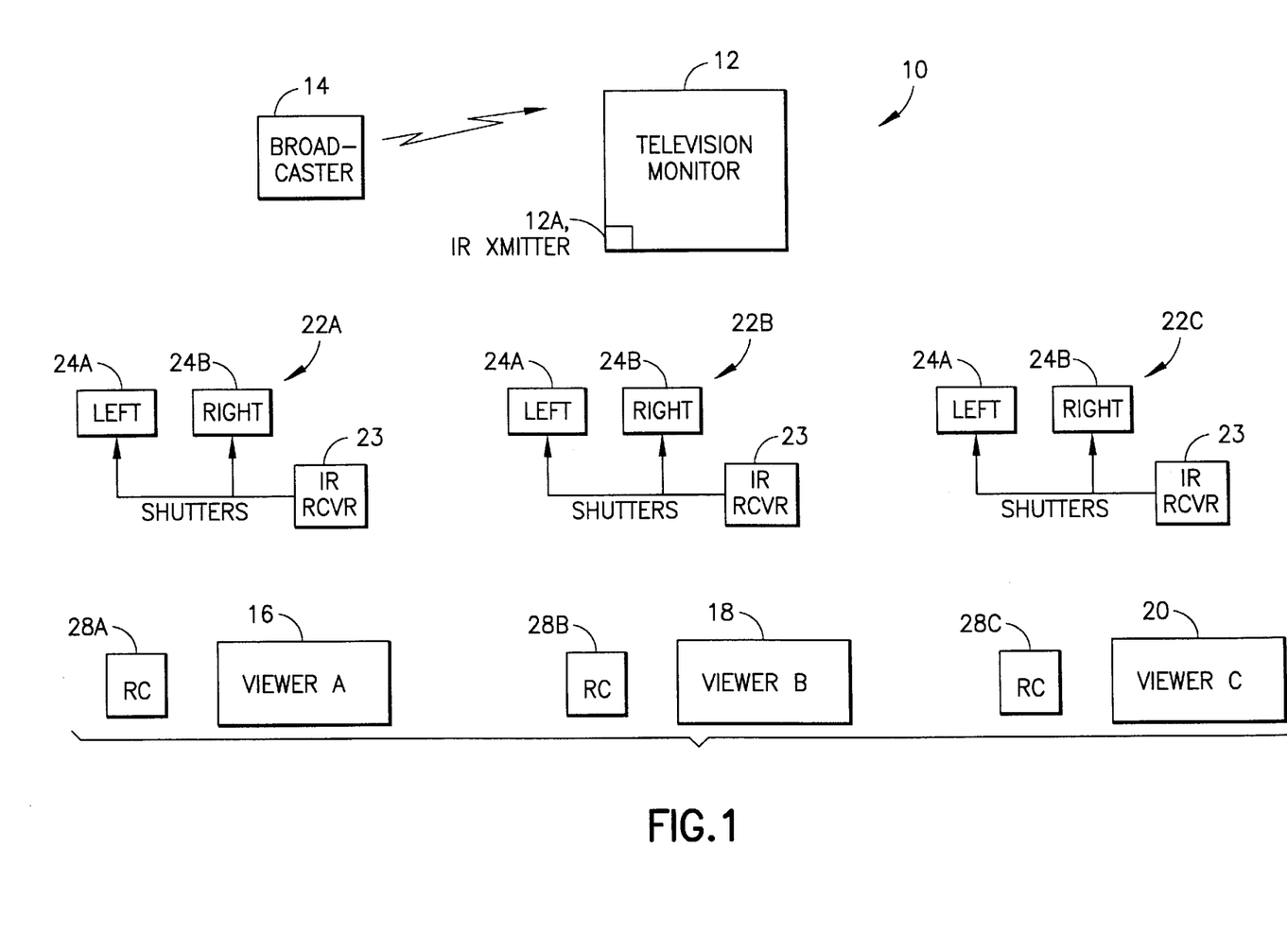
FIG. 1 is a block diagram of a TV viewing system in accordance with this invention, the system having a TV monitor and multiple shutter glasses worn by multiple viewers.

Referring to FIG. 1, and in accordance with the teaching of this invention, a TV monitor 12 receives a signal from a broadcaster 14 through a conventional rooftop or satellite antenna, or though a coaxial cable or a fiber optic cable. Signals may also be received from a computer interface, a VCR, a video game interface, an internet television interface, or any device capable of generating video and/or audio for display or reproduction on a television monitor. These plurality of program sources, and individual channels within a given program source, may be considered, for the purposes of this invention, to represent a plurality of video channels. Preferably the TV monitor 12 is a digital TV monitor, such as one compatible with a specification entitled ATSC Digital Television Standard, Doc. A/53, Sep. 16, 1995, by James C. McKinney and Robert Hopkins, that is modified in accordance with the teachings of this invention.

Each viewer, for example three viewers A, B and C, is provided with a video apparatus embodied as a pair of shutter glasses 22 (see FIGS. 5 and 7, described below). Each pair of shutter glasses 22 (designated 22A, 22B and 22C) includes a pair of electrically or mechanically actuated shutters (24A, 24B) which are positioned in front of the left and right eyes, respectively. The shutters 24A and 24B are preferably LC shutters that can be rapidly switched between an opaque and a transparent state. In this invention, as opposed to the conventional shutter glasses used for viewing three dimensional stereoscopic displays, the two shutters 24A and 24B are operated simultaneously to either both pass light to the viewer's eyes or both block light from reaching the viewer's eyes. The shutter glasses 22 also include one or more earphones or speakers 25, and a receiver, such as an IR receiver 23, for receiving control, synchronization, and possibly audio signals from a corresponding IR transmitter 12A located at the TV monitor 12. In other embodiments of this invention a wired connection could be made between the shutter glasses 22 and the monitor 12, or a radio frequency connection could be made. The particular type of connection made between the TV monitor 12 and the shutter glasses 22 is not particularly important, so long as the selected communication medium can support the required communication protocol, while being unobtrusive to the user. As such, an IR wireless connection is preferred.

Each viewer also has an associated, separately identifiable remote control (RC) 28 for at least selecting a video channel to be viewed. Other functions, such as adjusting or muting the audio volume, etc., can typically also be performed using the remote control 28.

The TV monitor 12 has the capability to vary its refresh rate to simultaneously provide different programs to variable numbers of viewers. For example, instead of refreshing one channel at 60 Hz, the TV monitor 12 refreshes the channel for each of the viewers at 60 Hz. For the case where there are three viewers A, B, C, as in FIG. 1, who have different viewing preferences, the TV monitor 12 refreshes one frame for viewer A, followed by one frame for viewer B, and then one frame for viewer C, before returning to the next frame for A and so on. This order of viewer refreshing is not mandatory, as shown in FIG. 6C, as the viewer's frames could be refreshed in some other order.

In the example of FIG. 1 the TV monitor 12 refreshes at a compound rate of 60*3=180 Hz. Conventional display screen phosphor persistence ranges from 10 to 60 microseconds for a typical computer screen. However, low persistence phosphors with persistence times in the range of 70 to 150 nanoseconds are available and are preferred, as the TV monitor screen can be refreshed at significantly higher rates than the current maximum of 105–135 Hz, even with the 60 microsecond persistence phosphors. As is well known, the persistence of the human visual system is at least $\frac{1}{24}$ of a second, as motion pictures are shown at 24 frames/sec.

Figure 2:
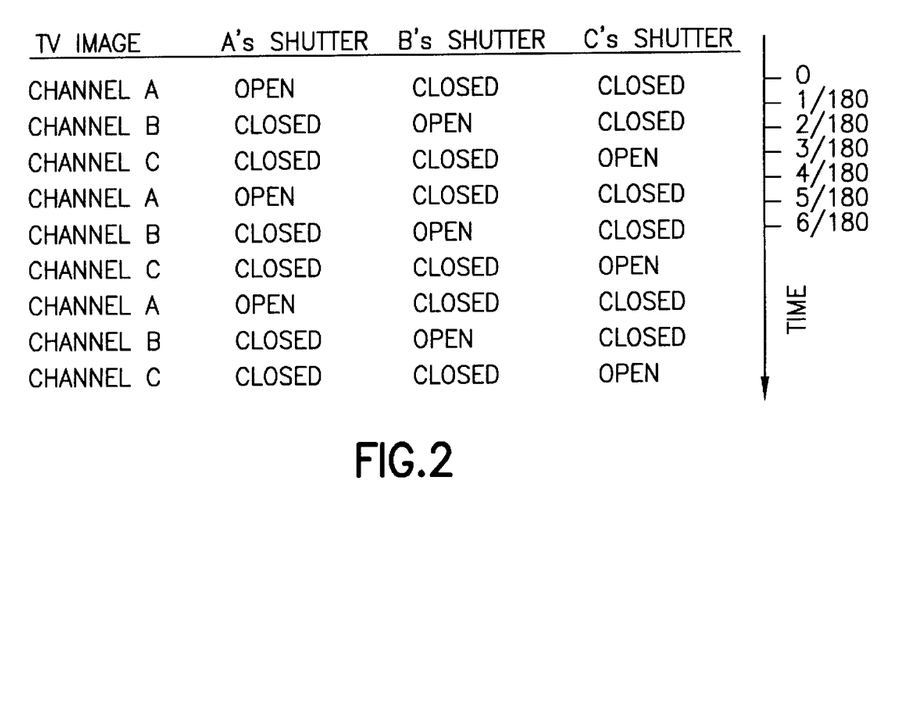
FIG. 2 illustrates an exemplary three viewer shutter opening and closing technique enabling each viewer to simultaneously view a different program using the TV monitor of FIG. 1.

The shutter glasses 22 for each viewer are synchronized with the operation of the TV monitor 12, as shown in FIG. 2. The TV monitor 12 transmits synchronization signals to synchronize the operation of the left and right shutters 24A and 24B for each viewer. The shutter glasses 22 receive the synchronization signals and regulate the opening and closing of the shutters 24A and 24B in accordance therewith. As can be seen, viewer A's shutter glasses 22 (both eyes) are open when the TV monitor 12 is displaying the viewer A's channel (Channel A), and are closed while the TV monitor 12 is displaying the Channels B and C for the other two viewers B and C, respectively. The operation is the same when displaying Channels B and C, such that each viewer is enabled to view only his or her selected channel. In that the channels are displayed at a rate that exceeds the persistence period of human vision, the viewer sees the associated channel with out flicker, and is not aware of the images displayed for the other viewers.

The audio portion is customized for each viewer by broadcasting a compound signal that is decoded in the shutter glasses 22 such that each viewer's shutter glasses 22 receives the audio for the correct channel. Each viewer may receive high fidelity stereo sound. The audio information may be broadcast using either a wired or wireless connection, with the wireless connection being preferred.

It should be noted that the shutter glasses 22 in accordance with an aspect of this invention do not have the physiological drawbacks, such as eye strain, that is associated with conventional stereo glasses. Eye strain occurs while viewing a stereoscopic display because content providers typically employ a significant amount of depth disparity to enhance the viewer's perception of depth. Also, the viewer's visual system is strained to coordinate the two different images being seen (first left, then right, then left, etc.) In the instant invention both eyes view the same image, and there is no depth disparity. As such, eye strain is reduced or eliminated.

The IR transmitter 12A could be isolated from the TV monitor 12 (such as being ceiling mounted) and, in such a system, the TV monitor 12 includes an IR receiver, like that of the shutter glasses 22, in order to switch between selected channels.

One conventional type of stereoscopic shutter glasses are available from StereoGraphics™ Corporation, and are known as SimulEyes™ VR. In this product a cable connects the glasses to the video output of the computer, and electronics in the glasses is responsive to the display synchronization signals to alternately activate left and right eye LC shutters.

The shutter glasses 22 of this invention can be similar in some respects to such conventional stereoscopic shutter glasses, but are otherwise modified to operate both LC shutters simultaneously, to adjust the timing to variable numbers of viewers, and to provide selective audio decoding, as described below.

Since there may be more than one channel being displayed each pair of glasses 22 is required to know when it should activate the LC shutters 24A and 24B. As such, the TV monitor 12 informs each pair of shutter glasses 22 (via the IR transmitter 12A and IR receiver 23) of the length of time for which it should control the LC shutters 24A and 24B to be transparent and opaque.

In a first embodiment of this invention a signal is sent to each pair of shutter glasses 22 each time the shutter glasses are required to switch states, thereby maintaining continuous, active synchronization of the operation of each pair of shutter glasses 22 to the operation of the TV monitor 12. In a second embodiment the shutter glasses 22 are only initially or periodically synchronized to the operation of the monitor 12, and thereafter each pair of shutter glasses 22 maintains synchronization using an internal synchronizing clock. Only when a change in the viewing situation occurs, such as when a new viewer is added, is another active synchronization signal sent from the monitor 12 to the pairs of shutter glasses 22, as shown in the logic flow diagram of FIG. 4. The first embodiment simplifies the design and operation of the shutter glasses 22, while the second embodiment simplifies the design and operation of the monitor 12.

Figure 6A:
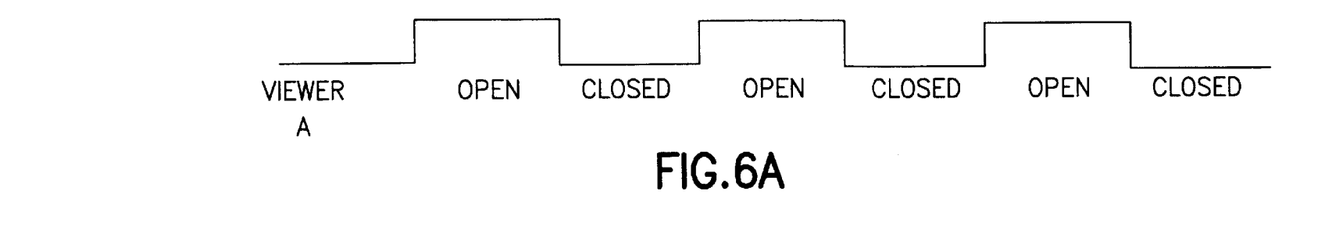
FIGS. 6A–6C illustrate timing diagrams and a TV monitor message packet format that is useful in explaining the operation of the invention.

FIG. 6A illustrates the timing for the first embodiment described above. Assume the signal is transmitted for viewer A, and that the signal is modulated to indicate the shutter open and closed times. The signal for viewer A is distinguished from the signals transmitted for viewer B (assuming two viewers for this example) by, for example, either amplitude modulation or frequency modulation.

Figure 6B:
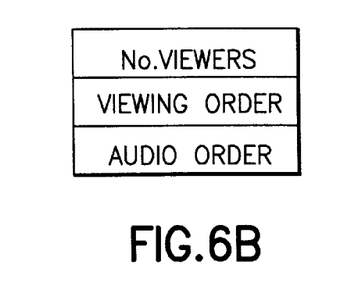
Figure 6C:
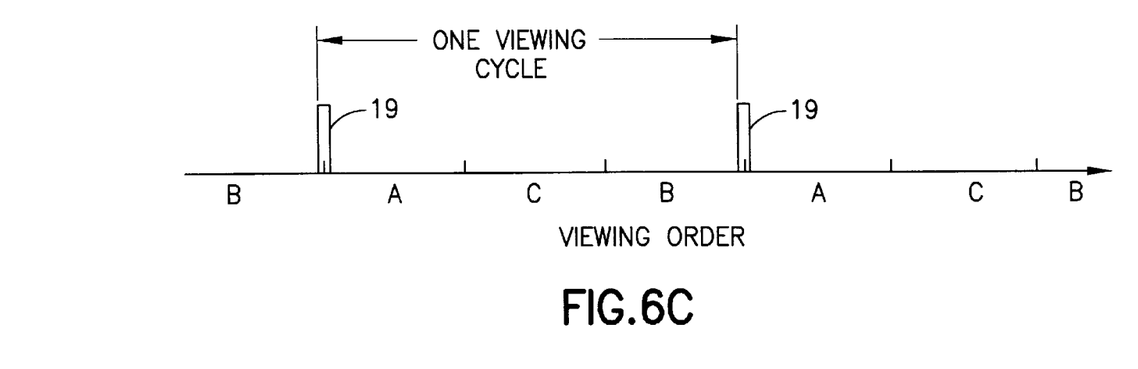

FIG. 6B illustrates an embodiment of a monitor signal command packet that is transmitted by the monitor 12 in accordance with the second embodiment. The command packet includes, by example, the current number of viewers, the viewing order (e.g., viewers A, B, C, or viewers A, C, B), and transmitted frequencies, or markers in a composite audio data stream, of associated audio channels. The command packet need be sent only when the viewing situation changes (e.g., a viewer is added or dropped).

FIG. 6C illustrates a further aspect of this second embodiment, and assumes the viewing order of viewer A, C, B. In this embodiment a synchronizing signal 19 can be transmitted by the monitor 12 at the beginning of every viewing cycle. For example, based on the number of viewers and viewing order received in the command packet of FIG. 6B, a given pair of shutter glasses 22 can determine the duration of the viewer's viewing slot during one viewing cycle, and the beginning and end of the viewer's slot relative to the other viewing slots. By example, assume that the viewing cycle has a duration of x milliseconds, and that from the command packet of FIG. 6B the shutter glasses 22 determine that there are three viewers ordered as A, C, B. The viewing period for one pair of shutter glasses 22 is thus x/3 milliseconds, the viewing period for viewer A starts coincident with the synchronizing signal 19 and ends x/3 milliseconds later, the viewing period for viewer C starts x/3 milliseconds after the synchronizing signal 19, and ends 2x/3 milliseconds later, and the viewing period for viewer B starts 2x/3 milliseconds after the synchronizing signal 19, and ends 3x/3 milliseconds later, or coincident with the next synchronizing signal 19.

Figure 5:
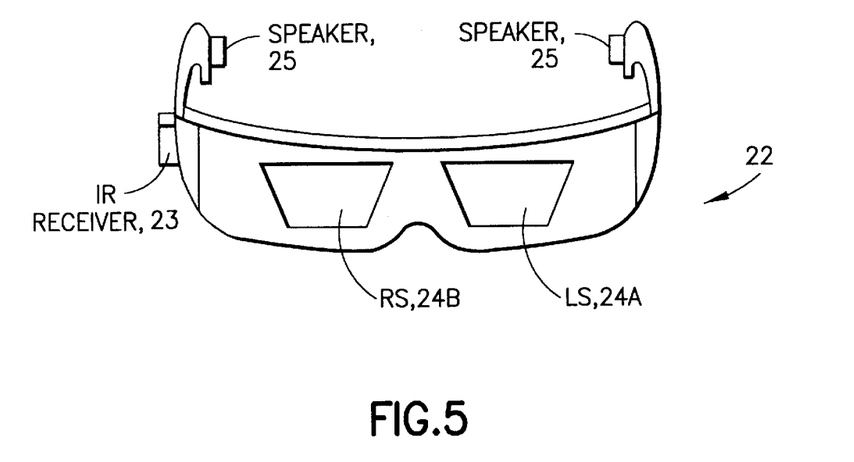
FIG. 5 is a simplified elevational view of one pair of shutter glasses.
Figure 7:
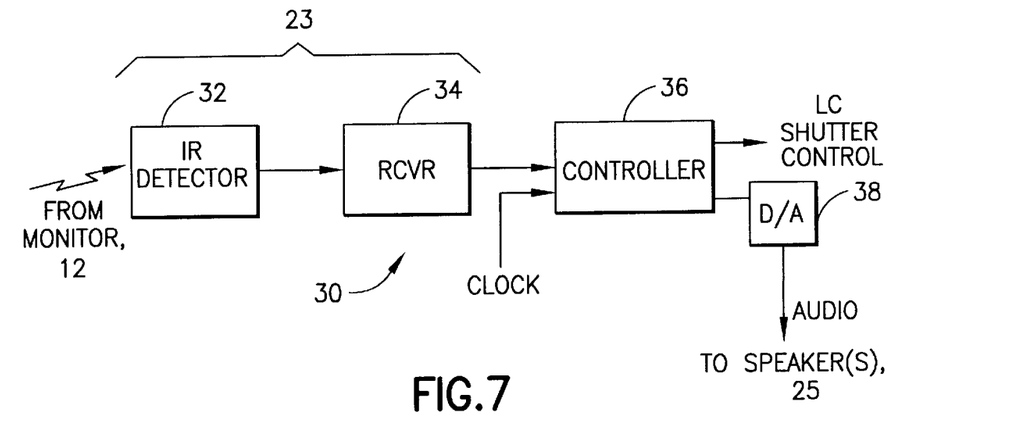
FIG. 7 is a simplified block diagram of circuit modules contained within the shutter glasses of FIG. 5.

Referring to FIGS. 5 and 7 there is illustrated an elevational front view of a representative pair of shutter glasses 22, and a simplified diagram of the electronics 30 of a pair of shutter glasses 22, respectively. The IR receiver 23 is comprised of an IR detector 32 and an amplifier, receiver, demodulator 34. The output of the receiver 34 is applied to a controller 36 wherein time slot decoding, LC shutter timing, and audio functions are performed. Each pair of shutter glasses 22 preferably includes an audio decoding apparatus for use with a digital TV monitor 12 that digitally broadcasts the audio for all viewed channels as a digital stream. A given pair of shutter glasses 22 receives and demodulates the audio data stream, selects the audio data associated with the channel being viewed, and converts the digital data to an analog signal in a D/A controller 38. The audio signal is then applied to one or more earphones or speakers 25 so that each viewer is individually supplied with the audio portion of the channel being viewed.

In another embodiment the audio stream for each channel is decoded in the monitor 12 and is then either amplitude or frequency modulated and transmitted into the room on a transmitted audio frequency channel (e.g., for three viewers three different audio frequency channels are used). The shutter glasses 22 tune to and select their assigned frequency and receive the audio for their channel. The shutter glasses 22 are informed of the transmitted frequency of the associated audio channel by the command packet shown in FIG. 6B. The IR link can be modulated so as to convey the audio portion, or a separate transmitter/receiver link (e.g., a low power FM RF link) can be used.

As was stated above, the TV monitor 12 is preferably a digital television monitor that is modified so as to operate with the shutter glasses 22. Further modifications relate to the time-multiplexed channel display and to the interaction with the remote controls 28.

Digital TV monitors currently have the ability to receive and decode many channels simultaneously. These channels may be received via cable, satellite or terrestrial broadcasts, from the internet, or from a VCR. They may be analog or digital.

Figure 8:
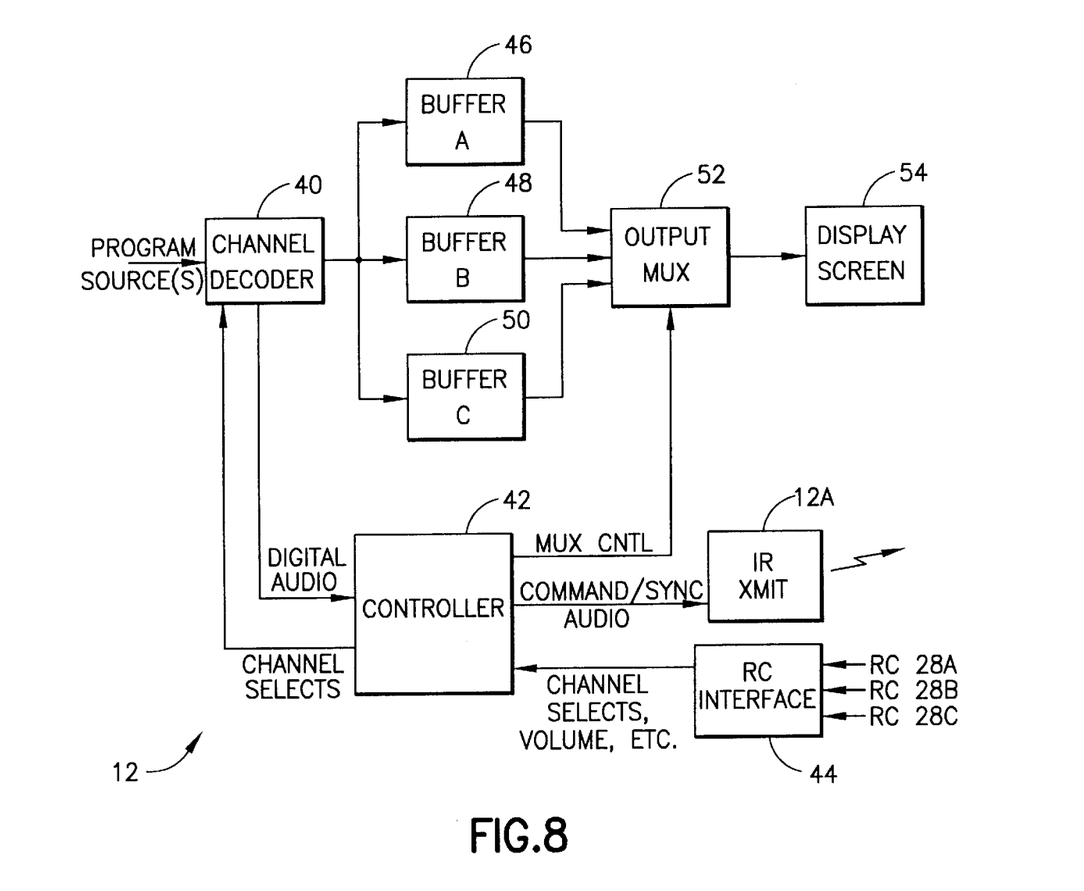
FIG. 8 is a block diagram of an embodiment of the TV monitor of FIG. 1.

In accordance with this invention, and referring to FIG. 8, the monitor 12 has an input for receiving digital signals from one or more programming sources and a channel decoder 40 controlled by a monitor controller 42. The monitor controller 42 receives inputs from the remote controls 28A–28C via an RC interface 44. The signal transmitted from each RC controller 28 can be separately identified, such as by transmitting a unique identification tag, so that a given viewer's channel selection, volume control, etc. can be separately identified. Based on the selected channel from each remote control 28, that channel's video information is stored in a corresponding channel full frame buffer (e.g., channel frame buffers A–C) 46, 48, 50. For HDTV applications each frame buffer 46, 48, 50 may have a number of storage locations to store RGB or YUV data for, by example, 1080×1920 display screen pixels or 720×1280 display screen pixels. A channel output multiplexer 52 is controlled by the monitor controller 42 so as to timemultiplex the video information onto a display screen 54. Digital audio is processed by the controller 42 and output to the shutter glasses 22 via the IR transmitter 12A, along with command packet and/or synchronization information (see FIGS. 6A–6C). Using this technique, and by example, viewer A may be viewing a cable news channel, viewer B may be viewing a motion picture received from a cable, satellite, or VCR, and viewer C may be browsing the internet using an internet television channel and appropriate interface.

It should be realized that two or more viewers may select the same program source, and that each viewer is not required to view a different program. In this case it is preferred that those viewers watching the same program be placed in the same time slot so that their respective shutter glasses 22 open and close their shutters 24A and 24B simultaneously. In an alternative embodiment each viewer is assigned a separate time slot, and the commonly watched channel is simply displayed two or more times during one viewing cycle.

In general, the timing of the occurrence of shutter open and closed times within the viewing cycle can be varied by the receipt of the synchronization signal to accommodate at least one of a change in a total number of viewers, or two or more viewers selecting the same video channel.

It should be further realized that a given viewer may select a video channel x, and an audio channel y associated with another video channel, assuming that the remote control 28 or some other input device is suitably configured. This mode of operation is useful if, for example, a viewer wishes to listen to a news or sports broadcast while viewing a movie, or wishes to listen to the dialog of a video presentation in another language (assuming that the audio portion of channel y is synchronized with the video portion of channel x).

Still referring to FIG. 8, in an alternative embodiment a single channel frame buffer may be reused for different channels. However, the required synchronization and decoding may make this a less desirable approach to the use of separate frame buffers 46–48.

Figure 3:
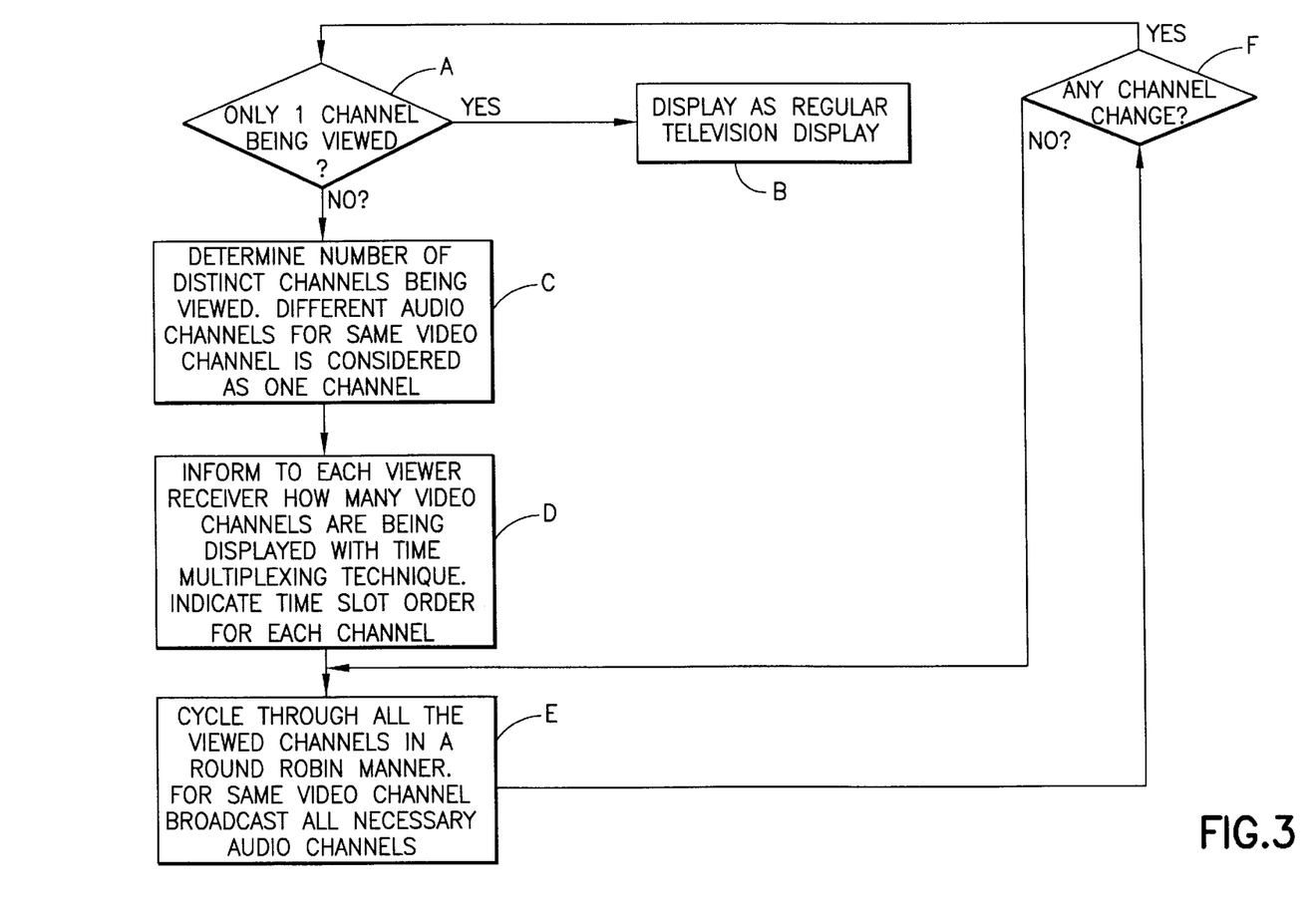
FIG. 3 is a logic flow diagram for illustrating a method executed by the TV monitor and/or broadcaster for simultaneously presenting multiple programs on the TV monitor of FIG. 1.

When a given one of the remote controls 28A–28C issues a command the TV monitor 12 receives it via the RC interface 44 and takes the necessary action, as shown in Block F of FIG. 3. Any changes become visible at the start of next time slot for the associated viewer.

When the TV monitor 12 is first turned on it may initialize to a single viewer, non-multiplexed mode, wherein a default channel or a last selected channel is displayed. The monitor may stay in the single viewer mode so long as it receives inputs from only one remote control 28. However, as soon as an input is received from a second remote control 28, the monitor 12 switches to a two viewer, time-multiplexed mode, requiring the use of the shutter glasses 22 to view two selected channels. The receipt of an input from a third remote control 28 places the monitor into a three viewer time-multiplexed mode, etc. Each remote control 28 can be provided with a button that functions as an on-off button, or simply as an off button, so that a viewer can signal that he or she has stopped viewing the monitor 12. By example, and if operating in the two viewer time-multiplexed mode, the receipt of the off signal from one of the remote controls 28 causes the monitor 12 to revert to the single viewer, non-multiplexed mode, and to display only the channel selected by the still active remote control 28.

It is also within the scope of this invention to provide an activity signal from a pair of shutter glasses 22 to indicate to the monitor 12 that the shutter glasses are operational. For example, switching on a power switch on the shutter glasses 22 may cause a transmitter mounted in the shutter glasses 22 to transmit a signal (through a wired or wireless link) to a suitable receiver at the monitor. A number of different embodiments of activity signal generating devices can be provided. As one further example, a small microswitch or a proximity sensor can be positioned in the shutter glasses 22 at a location where the microswitch or sensor is activated only when the shutter glasses are worn by a viewer. In this case the monitor 12 can be notified of those times when the viewer is actually wearing the shutter glasses 22, and is assumed to be watching his or her selected video channel.

Referring to FIG. 3, it can be seen that at Block A the monitor 12 determines if only one channel is being viewed. If yes, control passes to Block B to operate as a conventional television display. If no at Block A, control passes to Block C to determine the number of distinct channels being viewed, and then to Block D to inform the viewers, such as by the command packet of FIG. 6B, as to the number of viewers and channel order. At Block E the monitor 12 cycles through and displays all of the currently selected channels in one viewing cycle (see FIG. 6C), and then determines at Block F if a channel change has been commanded from one of the remote controls 28. If yes, control passes to Block A, else control passes to Block E to display the selected channels during the next viewing cycle.

Figure 4:
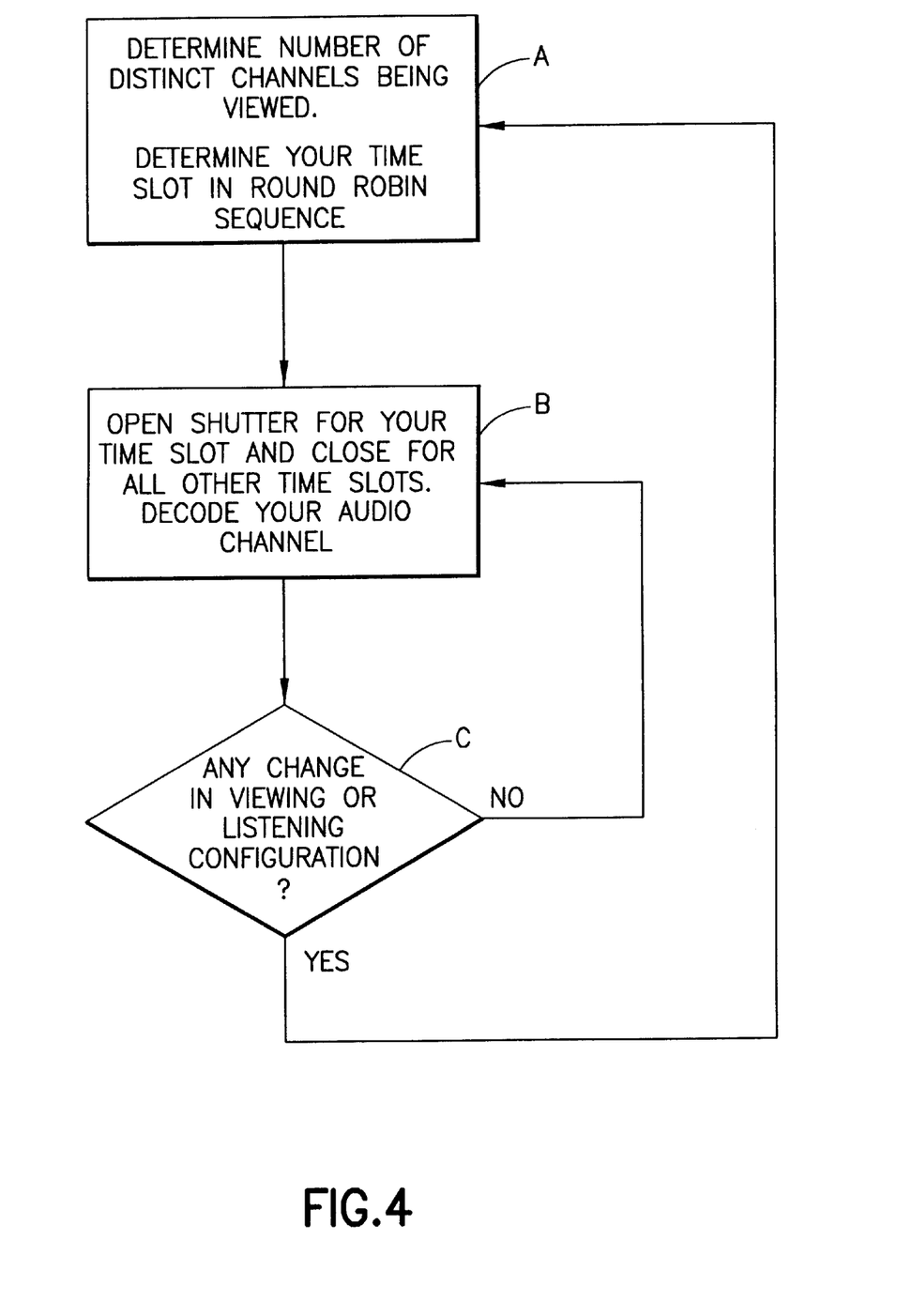
FIG. 4 is a logic flow diagram for illustrating a method executed by a shutter glass controller for enabling a viewer to observe one of the multiple programs on the TV monitor of FIG. 1.

During this time each pair of active shutter glasses 22 operates in accordance with the logic flow diagram of FIG. 4. At Block A the shutter glass controller 36 receives and decodes a command packet as described above. At Block B the controller 36 simultaneously opens and then closes the LC shutters during the assigned viewing slot, and at Block C makes a determination if any change has been indicated as occurring in the viewing or listening configuration. If no, control passes to Block B to continue operating the LC shutters at the appropriate times, otherwise control passes to Block A to determine the new viewing and timing parameters.

Although described above in the context of shutter glasses that employ separate shutters 24A and 24B for the left and right eyes, in other embodiments of this invention a single, larger shutter could be employed for blocking light from reaching both eyes. Also, while described above primarily in the context of a three-viewer system, more or less that three viewers can be served, with the maximum number being a function of available display screen phosphor persistence times, and the constraints imposed by human visual persistence.

Thus, while the invention has been particularly shown and described with respect to preferred embodiments thereof, it will be understood by those skilled in the art that changes in form and details may be made therein without departing from the scope and spirit of the invention.

What is claimed is:

1. A method for simultaneously viewing a plurality of video channels, on one display screen, with a plurality of viewers, comprising the steps of:

providing each of the plurality of viewers with visual apparatus that operates in two modes, wherein in a first mode the viewer is enabled to view an image on the display screen through the visual apparatus, while in the second mode the viewer is disabled by the visual apparatus from viewing an image on the display screen;

operating a display monitor that includes the display screen so as to time multiplex the display of a plurality of video channels selected by the plurality of viewers;

synchronizing the operation of each of the plurality of visual apparatus with the display screen such that each viewer is enabled to view the image on the display screen only during a time when a viewer-selected video channel is being displayed on the display screen, and automatically varying timing of the display of the plurality of channels to accommodate a change in a total number of viewers, or two or more viewers selecting the same video channel.

2. A method as in claim 1, wherein the visual apparatus includes at least one electrically actuated liquid crystal shutter that is transparent in the first mode and opaque in the second mode, and wherein the step of synchronizing includes a step of transmitting synchronization information to the visual apparatus for indicating a time when the at least one liquid crystal shutter is to switch from being transparent to being opaque, and from being opaque to being transparent.

3. A method as in claim 2, wherein the step of transmitting occurs over one of a wireless communications link or a wired communications link.

4. A method as in claim 2, wherein the step of transmitting occurs over a wireless communications link between the display monitor and each of the plurality of visual apparatus.

5. A method as in claim 1, and further comprising the steps of:

receiving, at each of the visual apparatus, an audio channel associated with the same or a different viewer-selected video channel; and converting the received audio channel into an audio signal for the viewer.

6. A method as in claim 1, wherein at least one of the video channels provides access to a data communications network.

7. A method as in claim 1, wherein at least one of the video channels provides access to the internet.

8. A system for simultaneously viewing a plurality of video channels, on one display screen, with a plurality of viewers, comprising:

a display monitor that comprises said display screen, said display monitor being coupled to at least one programming source and operating so as to time multiplex the display of a plurality of video channels selected by the plurality of viewers;

for each of the plurality of viewers, a visual apparatus that operates in two modes, wherein in a first mode the viewer is enabled to view an image on the display screen through the visual apparatus, while in the second mode the viewer is disabled by the visual apparatus from viewing an image on the display screen;

said system further comprising a synchronization subsystem for synchronizing the operation of each of said plurality of visual apparatus with the operation of said display monitor such that each viewer is enabled to view the image on said display screen only during a time when a viewer-selected video channel is being displayed on said display screen; and a subsystem for automatically varying timing of the display of the plurality of channels to accommodate a change in total number of viewers, or two or more viewers selecting the same video channel.

9. A system as in claim 8, wherein said visual apparatus includes at least one electrically actuated liquid crystal shutter that is transparent in the first mode and opaque in the second mode, and wherein said synchronization subsystem comprises a transmitter for transmitting information to each of said plurality of visual apparatus for indicating a time when the at least one liquid crystal shutter is to switch from being transparent to being opaque, and from being opaque to being transparent, and a receiver in each of said visual apparatus for receiving and decoding the transmitted information.

10. A system as in claim 9, wherein said transmitter and said receiver operate over one of a wireless communications link or a wired communications link.

11. A system as in claim 10, wherein said transmitter comprises a portion of said display monitor.

12. A system as in claim 8, wherein each of said visual apparatus comprises a receiver for receiving an audio channel associated with the same or a different viewer-selected video channel and means for converting the received audio channel into an audio acoustic signal for the viewer.

13. A system as in claim 8, wherein at least one of the video channels provides access to a data communications network.

14. A system as in claim 8, wherein at least one of the video channels provides access to the internet.

15. Visual apparatus worn by a viewer, said visual apparatus comprising a controller coupled to at least one electrically actuated shutter for enabling the viewer to observe a selected one of a plurality of time-multiplexed video channels on a display screen, said visual apparatus operating in two modes, wherein in a first mode the viewer is enabled to observe, with both eyes, an image on the display screen through the at least one shutter, while in the second mode the viewer is disabled by the at least one shutter from observing an image on the display screen, said visual apparatus further comprising a receiver for receiving a synchronization signal for synchronizing the operation of said at least one shutter to the time-multiplexed video channels such that the viewer is enabled to view the viewer-selected video channel on said display screen, wherein said first and second modes occur during a repeating viewing cycle, and wherein a timing of said first and second modes within said viewing cycle can be varied by the synchronization signal to accommodate at least one of a change in a total number of viewers, or two or more viewers selecting the same video channel.

16. A visual apparatus as in claim 15, and further comprising audio circuitry responsive to receiving an audio channel associated with the same or a different viewer-selected video channel for converting the received audio channel into an audio acoustic signal for the viewer.

17. A visual apparatus as in claim 15, wherein said at least one shutter is comprised of a liquid crystal shutter that is transparent in the first mode and opaque in the second mode, and wherein said receiver receives and decodes the synchronization signal for indicating a time when the liquid crystal shutter is to switch from being transparent to being opaque, and from being opaque to being transparent.

18. A visual apparatus as in claim 15, wherein said receiver receives the synchronization signal over one of a wireless communications link or a wired communications link.

19. A display monitor, comprising:

a display screen;

an first interface coupled to at least one programming source for receiving video and audio signals from the at least programming source;

a second interface for receiving signals from a plurality of separately identifiable viewer input devices;

a controller for operating said display screen in a time-multiplexed manner so as to sequentially display a plurality of video channels selected by a plurality of viewers using said viewer input devices, said plurality of video channels being sequentially displayed at a rate such that an individual viewer, when viewing said display screen only during a time that the viewer selected video channel is displayed, sees a continuous image of only the viewer's selected video channel; and a subsystem for automatically varying timing of the display of the plurality of channels to accommodate a change in total number of viewers or two or more viewers selecting the same video channel.

20. A display monitor as in claim 19, and further comprising a transmitter for transmitting a synchronization signal to a plurality of video apparatus individual ones of which are worn by individual ones of said users for synchronizing the operation of each of said plurality of visual apparatus with the operation of said display monitor, such that each viewer is enabled to view the image on said display screen only during a time when a viewer-selected video channel is being displayed on said display screen.

21. A display monitor as in claim 19, wherein said display monitor is responsive to signals received from said second interface for varying a timing of the sequential display of the plurality of video channels so as to accommodate at least one of different numbers of viewers, or two or more viewers selecting a same video channel.

22. A display monitor as in claim 20, and further comprising an audio portion for transmitting, to each of said plurality of visual apparatus, an audio channel associated with the same or a different viewer-selected video channel.

23. The method of claim 1, wherein said step of varying timing of the display further comprises:

transmitting a plurality of command packets from the display monitor to the visual apparatus, said command packets including data on the number of viewers and an order in which the channels are displayed.

24. The method of claim 1 wherein said step of varying timing is accomplished in response to a viewer using one of said plurality of viewers.

25. The method of claim 1, wherein said step of varying timing is accomplished in response to a viewer actuating a remote control device.

26. The method of claim 1, wherein each video channel is associated with a different program.

27. The method of claim 26, wherein there are more than two programs.

28. The method of claim 1, wherein the step of synchronizing is accomplished only periodically.

29. The system of claim 8 wherein said subsystem comprises a transmitter for transmitting a plurality of command packets from the display monitor to said visual apparatus, said command packets including data on the number of viewers and an order in which the channels are displayed.

30. The system of claim 8 wherein said subsystem comprises means for detecting when a viewer is using one of said visual apparatus.

31. The system of claim 30, wherein said means for detecting when a viewer is using one of said visual apparatus comprises a switch in said apparatus, said switch being activated when the apparatus is placed on the head of a viewer.

32. The system of claim 30, wherein said means for detecting when a viewer is using one of said visual apparatus comprises a remote control unit.

33. The system of claim 8, wherein each video channel is associated with a different program.

34. The system of claim 8, wherein there are more than two programs.

35. The system of claim 8, wherein the synchronization subsystem synchronizes only periodically.

36. The display monitor of claim 19 wherein said subsystem comprises a transmitter for transmitting a plurality of command packets from the display monitor to said visual apparatus, said command packets including data on the number of viewers and an order in which the channels are displayed.

37. The display monitor of claim 19 wherein said subsystem comprises means for detecting when a viewer is using one of said visual apparatus.

38. The display monitor of claim 37, wherein said means for detecting when a viewer is using one of said visual apparatus comprises a switch in said apparatus activated when the apparatus is placed on the head of a viewer.

39. The display monitor of claim 37, wherein said means for detecting when a viewer is using one of said visual apparatus comprises a remote control unit.

40. The display monitor of claim 19, wherein each video channel is associated with a different program.

41. The display monitor of claim 19, wherein there are more than two programs.

42. The display monitor of claim 19, wherein the synchronization subsystem synchronizes only periodically.

* * * * *